(12) United States Patent
Lou

(10) Patent No.: US 8,629,941 B2
(45) Date of Patent: Jan. 14, 2014

(54) PROGRAMMABLE REMOTE CONTROLLER AND SETTING METHOD THEREOF

(75) Inventor: Ruey-Der Lou, Hsinchu (TW)

(73) Assignee: IMU Solutions, Inc., Hsinchu (TW)

( * ) Notice: Subject to any disclaimer, the term of this patent is extended or adjusted under 35 U.S.C. 154(b) by 389 days.

(21) Appl. No.: 12/689,421

(22) Filed: Jan. 19, 2010

(65) Prior Publication Data
US 2010/0182515 A1 Jul. 22, 2010

(30) Foreign Application Priority Data
Jan. 16, 2009 (TW) .............................. 98101604 A

(51) Int. Cl.
 H04N 5/44 (2011.01)
 G05B 19/00 (2006.01)
 H04L 17/02 (2006.01)

(52) U.S. Cl.
 USPC ............. 348/734; 348/154; 340/5.1; 341/176

(58) Field of Classification Search
 None
 See application file for complete search history.

(56) References Cited

U.S. PATENT DOCUMENTS

| | | | |
|---|---|---|---|
| 6,603,420 B1 | 8/2003 | Lu | |
| 7,173,604 B2 | 2/2007 | Marvit et al. | |
| 2002/0085128 A1* | 7/2002 | Stefanik | 348/734 |
| 2004/0095268 A1* | 5/2004 | Miyazaki | 341/176 |
| 2004/0218104 A1* | 11/2004 | Smith et al. | 348/734 |
| 2005/0212911 A1* | 9/2005 | Marvit et al. | 348/154 |
| 2007/0139569 A1 | 6/2007 | Matsubayashi | |
| 2009/0153289 A1* | 6/2009 | Hope et al. | 340/5.1 |

FOREIGN PATENT DOCUMENTS

| | | |
|---|---|---|
| JP | 2007158621 A | 6/2007 |
| KR | 10-2001-0101902 A | 11/2001 |
| KR | 10-2003-0046094 A | 6/2003 |

* cited by examiner

*Primary Examiner* — Jefferey Harold
*Assistant Examiner* — Sean Haiem
(74) *Attorney, Agent, or Firm* — Kirton McConkie; Evan R. Witt

(57) ABSTRACT

A programmable remote controller, used for controlling audio/video devices, includes a main body, a button module, a motion-sensing module, a microprocessor unit, and a memory. The button module includes a function button group related to the control of the audio/video devices and a programming button group related to the setting of the remote controller. The setting method includes steps of: pressing a first button of the programming button group to start the setting method; pressing at least one function button of a function button group which corresponds to at least one function operation of the audio/video devices; controlling the main body of the remote controller to have a first motion status which is sensed by the motion-sensing module; and storing the first motion status and a first control command corresponding to the at least one function operation in the memory.

16 Claims, 6 Drawing Sheets

PROGRAMMABLE REMOTE CONTROLLER AND SETTING METHOD THEREOF

FIELD OF THE INVENTION

The present invention relates to a programmable remote controller and its associated setting method, and more particularly to a remote controller operated and set according to motion status of the remote controller which is sensed by a motion-sensing module.

BACKGROUND OF THE INVENTION

Recently, digital TV sets and high-quality liquid crystal display TV sets are rapidly developed and play an important role of home media centers involving audio/video devices. The TV sets can receive and process digital, analog, cable, wireless, or satellite TV signals. In addition, they are capable of communicating with various electronic apparatuses to serve as displays with expanded functions.

Please refer to FIG. 1, a block diagram illustrating a common home entertainment center. The home entertainment center 100 includes, not exclusively, a game device 101, an audio amplifier or a speaker 102, a network device 103, a signal receiving device 104, a display device 105, an audio input device 106 (e.g. microphone), a video camera 107, an audio/video reproducing device 108 (CD, DVD player or recorder), a microprocessor unit 109, a remote controller 110. These devices are in communication with each other via a data bus 111.

A typical example of a home entertainment center of FIG. 1 is illustrated in FIG. 2. The home entertainment center includes game consoles 21, computers 22, set-top boxes (STB) 23, TV sets 24, high fidelity (Hi-Fi) audio devices 25, and CD/DVD players and recorders 26. Various audio/video signals, including satellite signals, cable signals, radio signals or signals from Internet, may be received by the computers 22 and the set-top boxes 23 for further process and shown on TV sets 24. Certainly, the signals from the mentioned devices may be transmitted outwards through the computers 22 and the set-top boxes 23.

The TV sets or other audio/video devices may be operated from a short distance by a remote controller. By pressing keys or buttons on the remote controller, respective functions are performed. Because the rapid increase of functions of the audio/video devices, the remote controller with limited size may not have enough buttons to make each function to correspond to one dedicated button. In general, a remote controller has a power on/off button, an array of numeric buttons, direction buttons, a selection button, a menu button and so on. To solve the problem about insufficient buttons, the buttons may be cooperated with an electronic menu or an on-screen display (OSD) to show options on TV set to expand the selectable operations. However, since the home entertainment center involves more and more entertainment facilities, it is unavoidable that the design of the remote controller grows more complicated. Even though the electronic menu or on-screen display is used, it becomes more and more difficult and inconvenient to operate the complicated remote controller.

With the advance of microelectromechanical system (MEMS) and semiconductor technology, a motion sensitive remote controller is developed. A motion-sensing component is built in the motion sensitive remote controller to sense the movement, position, or motion status of the remote controller. The motion-sensing component may be implemented by an electronic compass, an accelerometer, a gyroscope or a combination of them so it can at least senses the relative position or motion status of the remote controller in the 3D space. When the user holds the remote controller and performs specific actions, the audio/video device may be operated as if the user presses a volume up/down button, a channel up/down button or a direction button of the conventional remote controller. In addition, a selective item of an electronic menu shown on the screen of the audio/video device can be highlighted or selected according to a pitch motion, a yaw motion or a rolling motion of the remote controller.

A drawback of the motion sensitive remote controller is that the possible actions for the remote controller are limited. Only up/down or left/right buttons may be easily substituted by up/down or left/right movements of the motion sensitive remote controller. In other words, still many functions of the audio/video devices should be operated by pressing the corresponding buttons on the remote controller. Although some specific actions for the remote controller are designed by different manufacturers to enhance the controllability of the remote controller, the actions are too complicated and unfamiliar for the user to memorize. Hence, the remote controller is not easy-to-use at all.

Therefore, there is a need of providing a remote controller to obviate the drawbacks encountered from the prior art.

SUMMARY OF THE INVENTION

The present invention relates to a programmable remote controller for controlling an audio/video device. The user can set the programmable remote controller to associate a specific function operation of the audio/video device with a predetermined motion status of the remote controller.

The present invention relates to a setting method of the programmable remote controller. The function operation of the audio/video device is associated with a predetermined motion status designed by the user. Via the setting method, the user can control the audio/video device by making the remote controller have the predetermined motion status.

In accordance with an aspect of the present invention, a remote controller for controlling an audio/video device includes a main body, a button module, a motion-sensing module, a microprocessor unit, and a memory. The button module is disposed on the main body for generating an actuating signal in response to the press of a button of the button module. The motion-sensing module is disposed in the main body for generating a sensing signal in response to a motion status of the main body. The microprocessor unit, disposed in the main body and in communication with the button module and the motion-sensing module, receives and processes the actuating signal and the sensing signal to generate a control command corresponding to at least one function operation of the audio/video device. The control command to be accessed by the microprocessor unit is stored in the memory.

In accordance with another aspect of the present invention, a method for setting a remote controller used for controlling an audio/video device is provided. The remote controller includes a main body, a motion-sensing module, a microprocessor unit, a memory and a button module. At first, a first button of a programming button group of the button module is pressed to start the setting method. Then, at least one function button of a function button group of the button module is pressed. A second button of the programming button group of the button module is then pressed to end the function button input so as to determine at least one function operation of the audio/video device corresponding to the at least one function button. The user holds the main body and has the main body of the remote controller be in a first motion status which is sensed by the motion-sensing module. At last, the first motion status and a first control command corresponding to the at least one function operation of the audio/video device is stored in the memory by the microprocessor unit to finish the setting method.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The remote controller according to the present invention takes advantage of a motion-sensing module to sense the motion status of the remote controller held by the user. The operations of pressing function buttons of the conventional remote controller such as power on/off button, volume up/down buttons, channel up/down buttons and direction buttons may be partially or totally replaced by controlling the motion status of the novel remote controller. Furthermore, an additional button group used for setting or programming the remote controller is disposed in the remote controller so that the user may operate the remote controller in a more direct and easier manner to control the corresponding audio/video devices. The user may associate specific gesture with desired function operation(s) of the audio/video devices.

In order to detect the motion status of the remote controller to recognize the motions of the users hand or the users gesture, the built-in motion-sensing module may be implemented by an accelerometer, a gyroscope, an electronic compass or a combination of them. The motion-sensing module has to at least sense the relative position or the motion status of the remote controller in the 3D space. Nowadays, the most used motion-sensing module is the accelerometer provided based on microelectromechanical system technology. The possible motion types include a pitch motion, a yaw motion, a rolling motion and so on. Such easier actions are better accepted by the public.

Figure 1:
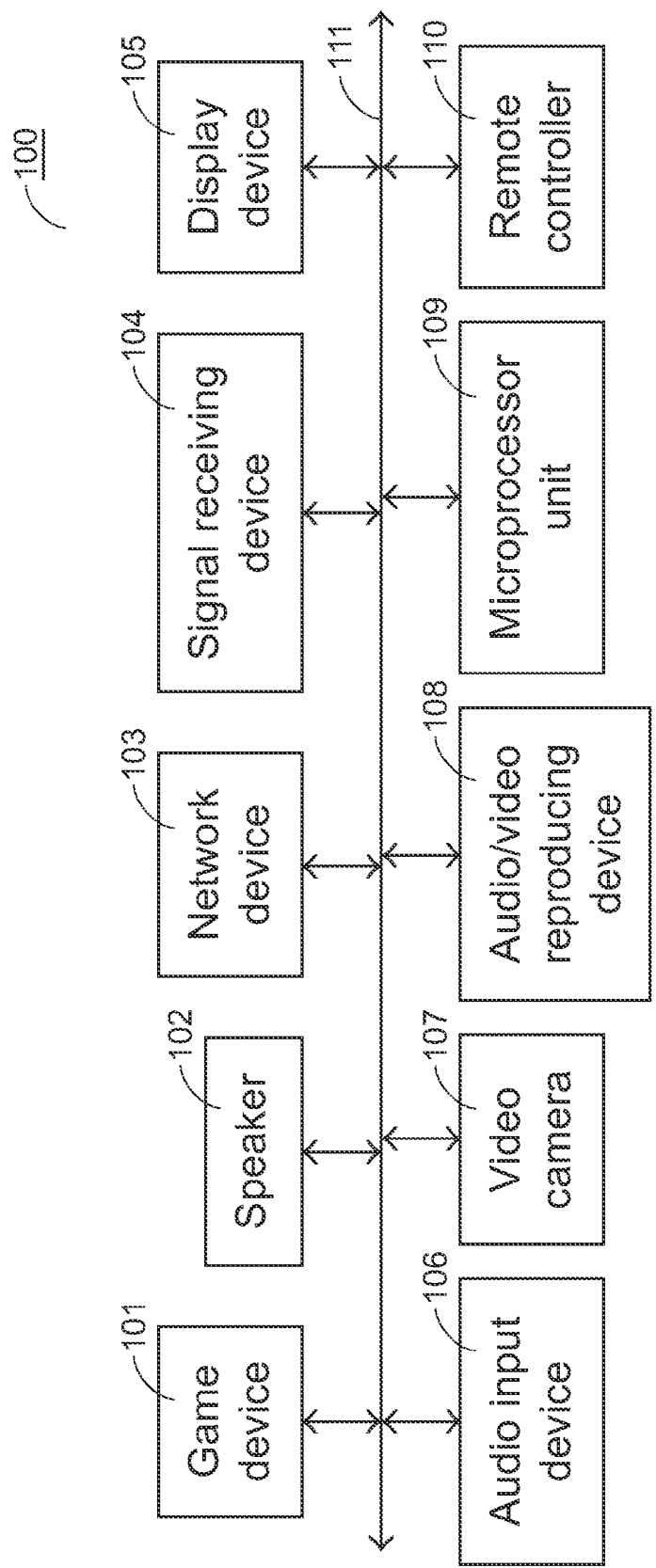
FIG. 1 is a block diagram illustrating a common home entertainment center.
Figure 2:
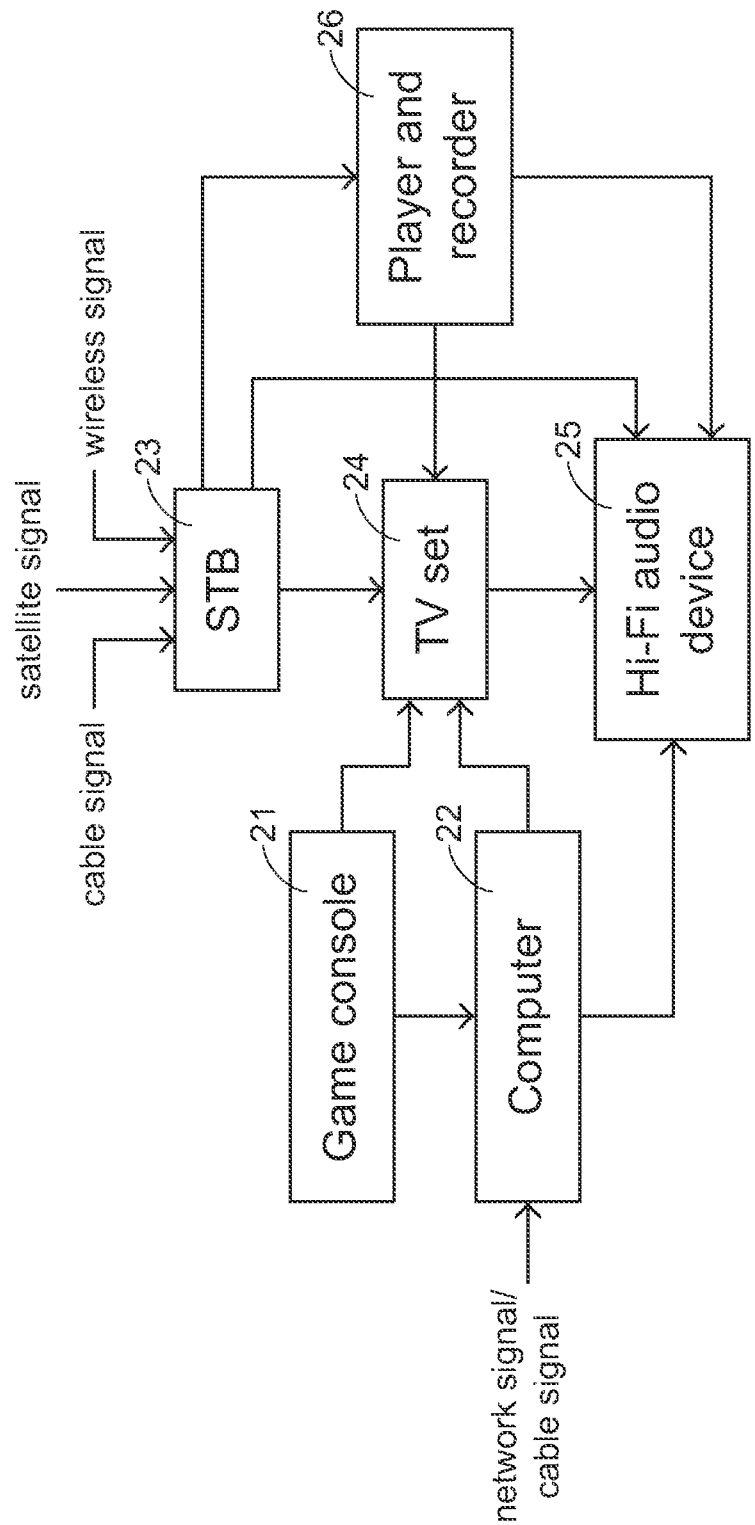
FIG. 2 is a block diagram illustrating a typical example of the home entertainment center of FIG. 1.
Figure 3A:
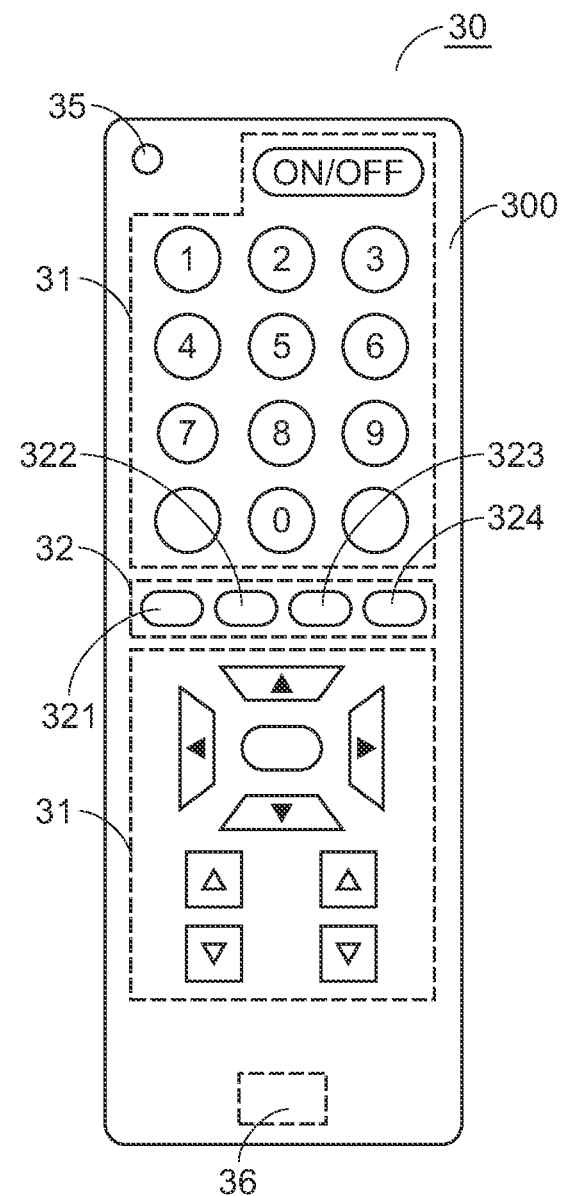
FIG. 3A is a perspective view illustrating a remote controller according to an embodiment of the present invention.

Please refer to FIG. 3A, a perspective view illustrating a remote controller according to an embodiment of the present invention. A button module is provided on a surface of the remote controller 30. The button module includes a function button group 31 and a programming button group 32. As shown in FIG. 3A, the function button group 31 may include a power on/off button, an array of numeric buttons, direction buttons, a selection button, a menu button, volume up/down buttons, channel up/down buttons, which are the familiar buttons one may see in the common remote controller. The user may press any button of the function button group 31 to correspondingly control or operate the audio/video device.

Figure 3B:
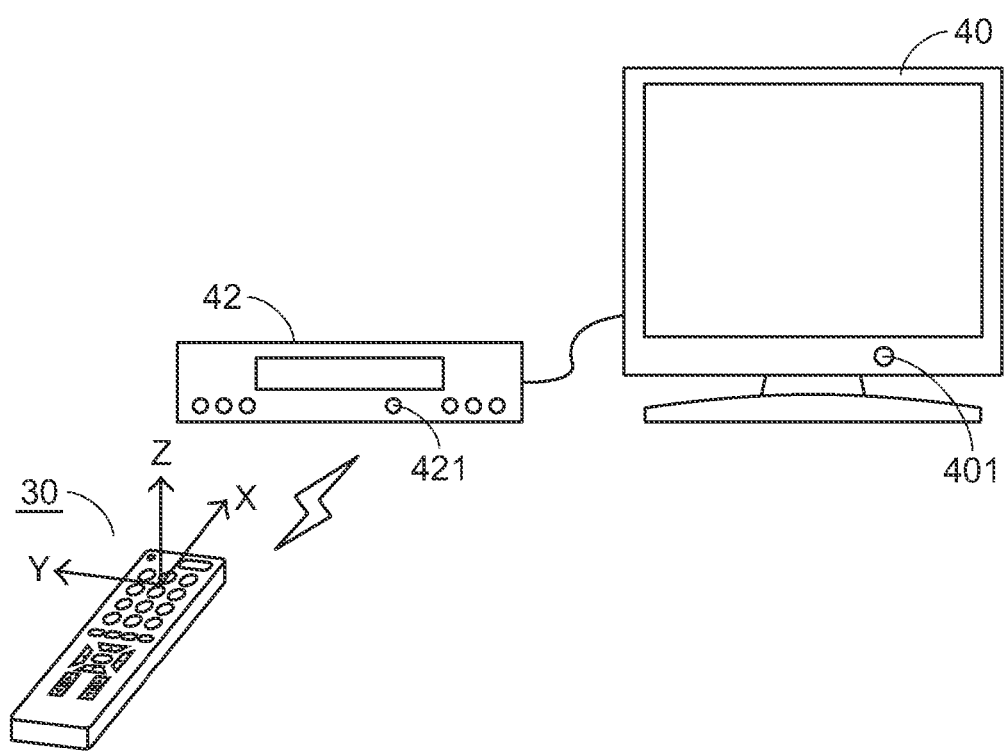
FIG. 3B illustrates the use of the remote controller of FIG. 3A.

Please also refer to FIG. 3B illustrating the use of the remote controller 30 in a small-scale home entertainment center. The so-called home entertainment center is a system integrating various audio/video devices, which are controlled by a remote controller. In this example, the remote controller 30 is used for controlling a TV set 40 and a game console 42. Respective wireless receiver units 401 and 402 are mounted on the TV set 40 and the game console 42 to receive control signals from the remote controller 30 to perform or activate corresponding functions. Hence, by pressing one button of the function button group 31, one or more function operations of the TV set 40 or the game console 42 start.

The programming button group 32 includes a start button 321, a set button 322, an action button 323, and a memory button 324. In response to the press of the start button 321, the setting and programming procedure starts. After one or more buttons of the function button group 31 corresponding to the desired function operations of the audio/video devices are sequentially pressed, the set button 322 is pressed by the user to inform the remote controller 30 of the end of the button input. Then, the motion status of the remote controller 30 is detected and temporarily stored when the action button 323 is continuously pressed. At last, the memory button 324 is pressed to store the sensed motion status and a control command corresponding to the desired function operations which correspond to the sequentially pressed function buttons.

In this embodiment, the remote controller 30 has a main body 300 to be held by the user to perform a pitch motion, a yaw motion, a rolling motion or a combination of them. To indicate the setting status, an indicator 35 (FIG. 3A) in a light form or an audio form is mounted on the main body 300 of the remote controller 30. For example, the indicator 35 may lights up, flashes, or changes its color to indicate any press of the programming button group 32 or the setting status operation modes of the remote controller 30. Alternatively, audio instructions can be outputted form the indicator 35 during the setting procedure. Further, a motion-sensing module 36 is disposed in the main body 300 of the remote controller 30 for detecting its movement to recognize the gesture of the user who holds the remote controller 30. In one embodiment, the motion-sensing module 36 is an accelerometer, a gyroscope, an electronic compass or a combination of them for precisely detects the 3D motions.

To explain 3D motions, three reference axes X, Y and Z are marked in FIG. 3B. The pitch motion indicates that the head end of the remote controller 30 moves upwards or downwards around the Y-axis. The yaw motion indicates that the head end of the remote controller 30 moves leftwards or rightwards around the Z-axis. The rolling motion indicates that the remote controller 30 is rotates clockwise or counterclockwise around the X-axis.

Figure 3C:
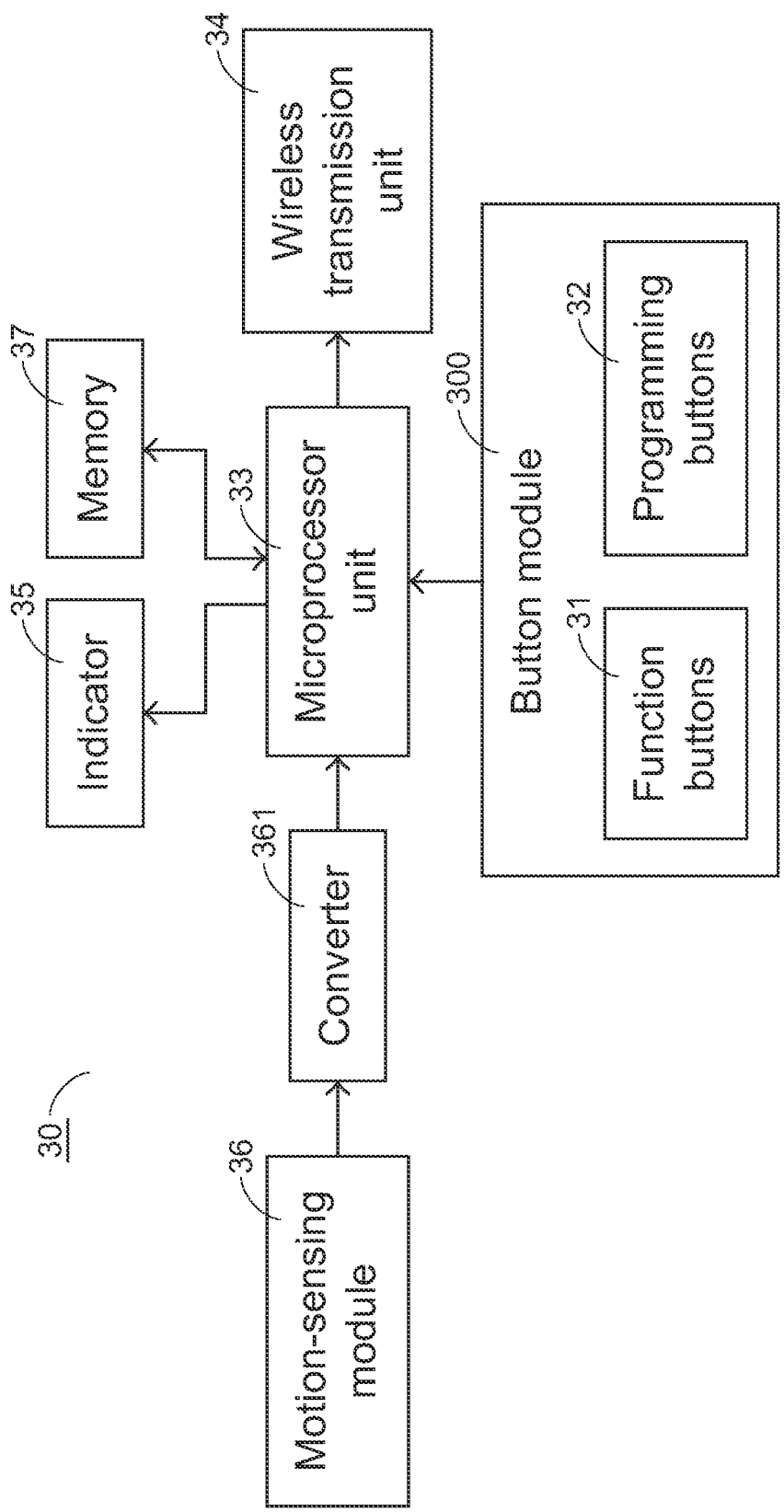
FIG. 3C is a functional block diagram illustrating the remote controller of FIG. 3A.

Please refer to FIG. 3C, a functional block diagram illustrating the inner circuits of the remote controller 30. In the main body 300 of the remote controller 30, a microprocessor unit 33, a wireless transmission unit 34 and a memory 37 are disposed. In addition, the button module (including the function buttons (function button group) 31 and the programming buttons (programming button group) 32, the indicator 35, the motion-sensing module 36, the wireless transmission unit 34 and the memory 37 are in communication with the microprocessor unit 33, which is the core for processing signals.

The motion-sensing module 36 generates sensing signals corresponding to the motion status of the remote controller 30. If the sensing signals are analog signals, a converter 361 is optionally provided in the remote controller 30 to convert the analog signals into digital signals to be processed by the microprocessor unit 33. Besides, the button module generates actuating signals in response to the press of the buttons. The sensing signals from the motion-sensing module 36 and the actuating signals from the button module are processed by the microprocessor unit 33 to generate control signals for the audio/video devices.

Figure 4:
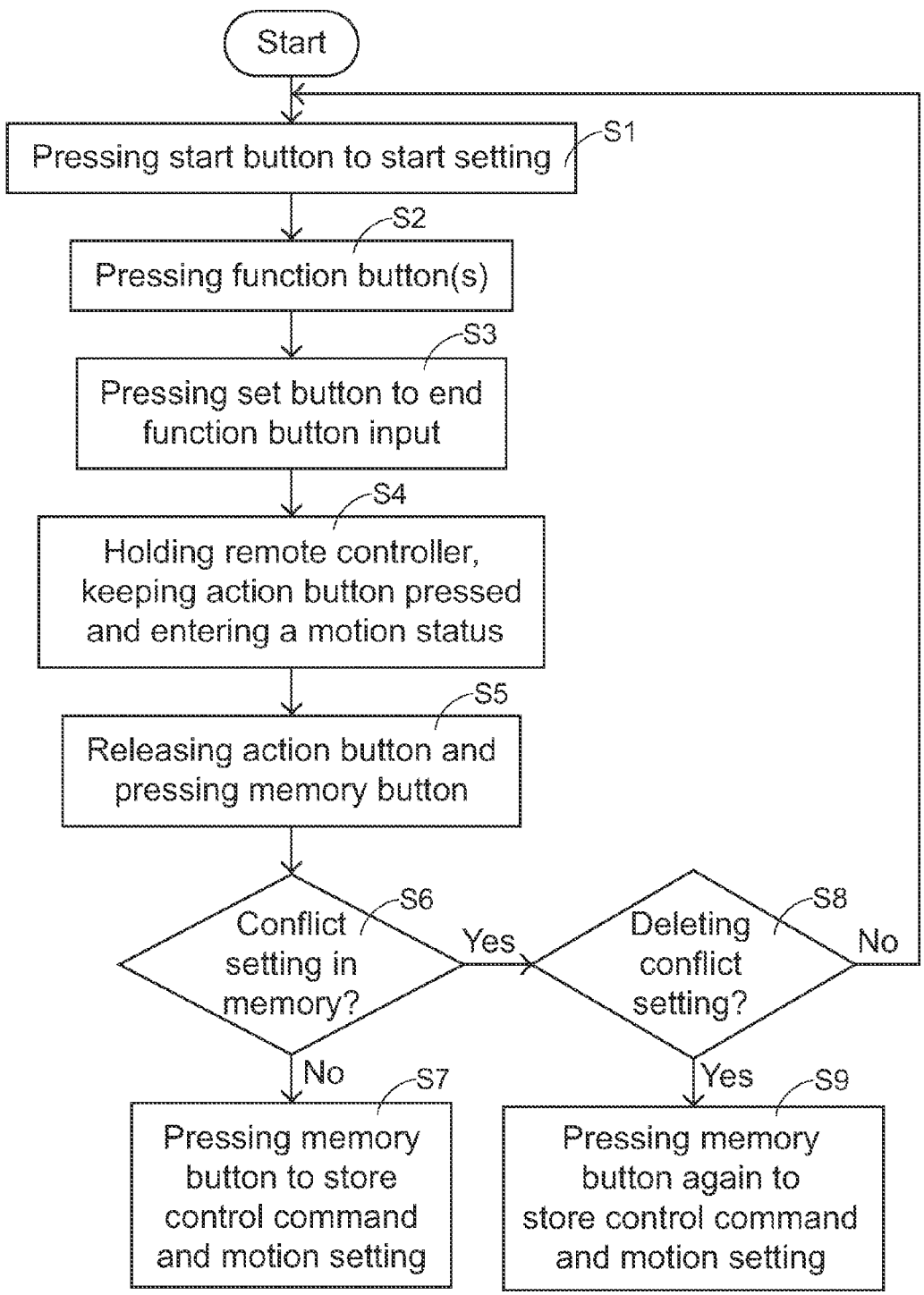
FIG. 4 is a flowchart illustrating a method for setting the remote controller of FIG. 3A according to an embodiment of the present invention.

Please refer to FIG. 4, a flowchart illustrating a method for setting or programming the remote controller according to an embodiment of the present invention. According to the method, the user can set the remote controller 30 to map the function operations of the TV set 40 or the game console 42 corresponding to the press of the function buttons to a specific motion status of the remote controller 30. The steps are described in more detail as follows.

At first, the user presses the start button 321 to activate the setting procedure for the remote controller 30 (step S1). At this time, the indicator 35 may light up to indicate the current setting mode of the remote controller 30. In one embodiment, when the start button 321 is pressed, the control signals generated due to the press of the function button group 31 are not output to control the TV set 40 or the game console 42 until the setting procedure is completed. In other words, the function button group 31 is used for deciding the function operations to be mapped to a predetermined motion status of the remote controller 30, but not controlling the TV set 40 or the game console 42 during the setting procedure.

Then, the user sequentially presses the function button(s) of the function button group 31 corresponding to the desired function operations (step S2). In one embodiment, the user has to press at least one function button. Alternatively, a sequence of function buttons may be pressed to determine the operation combination. For example, the user may only press the power on/off button at this step. In another example, the user may press the volume up/down buttons several times to adjust the sound to a fixed volume. Perhaps, an example of the sequence of function buttons is a combination of two or three numeric buttons, which tunes to the users favorite channel. Other combination involving less or more button pressing is also applicable. In the meantime, the indicator 35 continuously lights up.

After all the button sequence is input, the user presses the set button 322 to end the button input (step S3). In an embodiment, the press of the set button 322 informs the remote controller 30 that the button input is completed. The function operations corresponding to the button sequence will be mapped to a particular action or gesture appointed by the user later. The actuating signals generated by pressing the button module (the function button group 31 or the programming button group 32) and the sensing signals generated by sensing the motion status from the motion-sensing module 36 are transmitted to the microprocessor unit 33 which manages the mapping procedure. At this time, the indicator 35 flashes or its light color changes to inform the user that the motion-sensing step could start.

In a preferred embodiment, the user holds the main body 300 of the remote controller 30 and keeps the action button 323 pressed when the user performs a motion to enter the remote controller 30 in a first motion status (step S4). The first motion status is a pitch motion, a yaw motion, a rolling motion or a combination of these motions, which can be sensed and recognized by motion-sensing module 36. For example, the user holds the remote controller 30 and turns it around the X-axis (FIG. 3B) clockwise by 90 degrees and then turns it counterclockwise by another 90 degrees while the action button 323 is kept pressed. Therefore, the first motion status consists of a 90-degree clockwise rolling motion and a 90-degree counterclockwise rolling motion. According to the present invention, the sensed motion status, regardless of the pitch motion, the yaw motion, the rolling motion or the combination of these motions, permits a tolerance limit or error limit. Hence, the subsequent motion status may fit the first motion status even though they are not exactly the same.

Then, the user releases the action button 323 to finish the motion-sensing step, and further presses the memory button 324 to store a first control command corresponding to the input function button sequence and the first motion status (may be saved in the form of sensing signal) (step S5). When the user operates the remote controller 30 in a manner that is sensed and considered consistent with the first motion status, the remote controller 30 emits the control signals corresponding to the first control command to control or operate the TV set 40 or the game console 42.

In addition, a determination step is provided to judge whether a conflicting setting exists in the memory 37 (step S6). If no conflict exists, the setting including the first motion status and the first control command corresponding to the function button sequence inputted in step S2 is stored in the memory 37 by the microprocessor unit 33 (step S7). At the same time, the indicator 35 is off to indicate that the setting procedure is finished.

However, if the microprocessor unit 33 checks in the memory 37 that the same motion status has been mapped to a second control command different from the first control command, it means that the first motion status has been assigned to other function operations. In the meantime, the indicator 35 remains flashing or changes its light color to indicate that conflict setting exists.

In response to the flashing or the change of light color, the user may decide to overwrite the original setting in the memory 37 or reprogramming the remote controller 30 (step S8). If the user decides to store the newest setting, the memory button 324 is pressed again so that the setting including the first motion status and the first control command corresponding to the function button sequence inputted in step S2 is stored in the memory 37 by the microprocessor unit 33 (step S9). Thus, the second control command is replaced by the first control command. When the user holds the remote controller 30 and performs the same motion, a control signal corresponding to the first control command is outputted to control or operate the TV set 40 or the game console 42.

If the user decides to remain the original setting including the first motion status and the second control command, the start button 321 is pressed again to reprogramming the remote controller 30 (back to step S1). A second motion status of the remote controller different from the first motion status is provided and sensed in the motion-sensing step so that the microprocessor unit 33 may appoint the first control command to the second motion status. The second motion status, for example, may consist of a 90-degree upward pitch motion and a 90-degree downward pitch motion. Certainly, a pitch motion, a yaw motion, a rolling motion or a combination of these motions is applicable.

Alternatively, when the start button 321 is pressed again to reprogram or reset the remote controller 30, the function button input step (steps S2 and S3) may be eliminated to directly jump to the motion-sensing step (step S4). The reprogramming procedure is thus simplified.

In this manner, the first motion status and the second motion status are associated with different function operations corresponding to one or more function buttons. For example, the function operations may include powering on the TV set 40, switching to a predetermined channel, and adjusting the sound to a fixed volume. These operations are sequentially done after the user holds the remote controller 30 and performs a predetermined action corresponding to the motion status recorded in the memory 37 of the remote controller 30 in advance.

In other words, the user may control or operate the TV set 40 in two ways: to press the buttons of the function button group 31 or move the remote controller 30 in a predetermined manner while continuously pressing of the action button 323. The microprocessor unit 33 outputs the control signals in response to the press of the function buttons or finds the control commands corresponding to the motion status of the remote controller 30 recorded in the memory 37 and then outputs the corresponding control signals. The wireless transmission module 34 passes the control signals to the TV set 40 in a wireless manner. The control signals are received by the wireless receiver unit 401 of the TV set 40 to allow the TV set 40 to perform functions accordingly.

In the above-described motion-sensing step (step S4), the action button 323 is kept pressed. The action button 323 is released after the function button input is finished (step S5). The press and release of the action button 323 define the start time and end time of the motion status to be sensed. However, the action button 323 can be eliminated on condition that the start time and the end time of the motion status to be sensed can be clearly defined. For example, the remote controller 30 is held still in a very short period, maybe a few seconds, after the set button 322 is pressed. Then, the motion status is sensed and another still period follows. The motion-sensing module 36 according to the present invention can effectively determine the start time and the end time of the motion status to be sensed according to the voltages of the sensing signals. Thus, the action button 323 can be eliminated without causing trouble. Similarly, when the user wants to control or operate the TV set 40 by gesture without pressing the function buttons, two short still periods are provided before and after the gesture. The microprocessor unit 33 searches in the memory 37 to find out the corresponding control command according to sensed motion status between the two still periods and then sends the corresponding control signals out.

Although the above-described embodiment refers to the control of the TV set, the remote controller 30 can be used for controlling or operating other known audio/video devices such as the game console 42. In another embodiment, a switch button (now shown) may be provided on the remote controller 30 to switch control between the TV set 40 and the game console 42. Certainly, the switch function may be mapped to a motion status of the remote controller 30 as described above. For controlling the game console 42, game function buttons (not shown) should be provided on the remote controller 30. Similarly, the game functions may be mapped to corresponding motion statuses of the remote controller 30 to meet the users requirements. Hence, the user can play games via gesture control without pressing the game function buttons on the remote controller 30. The game functions are partially or totally mapped to predetermined motion statuses based on the game complexity and the capability of the microprocessor unit 33.

From the above description, the present invention provides a programmable remote controller which is set by the user on one's own terms. The user may associate frequently-used function operations to comfortable gestures or motions so that the use of the remote controller becomes easier. Furthermore, a simple gesture may represent a sequence of function operations which are possibly performed by pressing several buttons of the conventional remote controller. Such design significantly enhances the convenience of the remote controller without doubt. The programmable function makes the remote controller more flexible because the motions designed by the manufacturers are not the only choice. The user may arbitrarily remain, delete, or overwrite the setting during the programming procedure. In conclusion, the remote controller and its setting method may effectively solve the problems encountered in the prior arts.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A remote controller for controlling an audio/video device, comprising:
   a main body to be held by a user;
   a button module disposed on the main body for generating an actuating signal in response to the press of a button of the button module, the button module comprising:
      a function button group to be pressed to make the audio/video device to perform one or more operations; and
      a programming button group to be pressed to program the remote controller to associate a motion status with a control command corresponding to the one or more function operations of the audio/video device;
   a motion-sensing module disposed in the main body, and having therein an adjustable sensing tolerance limit related to a complexity of an electronic menu for generating a sensing signal in response to the motion status of the main body;
   a microprocessor unit disposed in the main body and in communication with the button module and the motion-sensing module for receiving and processing the actuating signal and the sensing signal, and the microprocessor unit having a conflicting setting to associate an operation error limit with the control command corresponding to the one or more function operations of the audio/video device as the sensing signal is out of the adjustable sensing tolerance limit, the operation error limit being related to the adjustable sensing tolerance limit; and
   a memory in communication with the microprocessor unit for storing the motion status and the control command to be accessed by the microprocessor unit.

2. The remote controller according to claim 1 wherein the microprocessor unit issues a control signal corresponding to the control command in response to the motion status of the main body.

3. The remote controller according to claim 2 wherein the remote controller further comprises a wireless transmission unit in communication with the microprocessor unit for receiving and outputting the control signal to the audio/video device via wireless transmission to perform the one or more function operations of the audio/video device.

4. The remote controller according to claim 1 wherein the programming button group further comprises:
   a first button to be pressed to start a programming procedure of the remote controller;

a second button to be pressed after one or more function buttons of the function button group corresponding to the one or more function operations of the audio/video device are pressed by the user;

a third button being as an action button to be continuously pressed to make the motion-sensing module to sense the motion status of the main body; and a fourth button to be pressed to store the sensed motion status together with the control command.

5. The remote controller according to claim 1 wherein the remote controller comprises an indicator disposed on the main body and in communication with the microprocessor unit, for emitting light, flashing, or changing light color to indicate the programming procedure.

6. The remote controller according to claim 1 wherein the motion status of the main body includes a pitch motion, a yaw motion, a rolling motion, or a combination thereof.

7. The remote controller according to claim 1 wherein the motion-sensing unit is implemented by an accelerometer, a gyroscope, an electronic compass, or a combination thereof.

8. A method for setting a remote controller used for controlling an audio/video device, the remote controller comprising a main body, a motion-sensing module, a microprocessor unit, a memory and a button module disposed on the main body, the method comprising steps of:

generating an actuating signal when a button of the button module is pressed, the step further comprising:

pressing a first button of a programming button group of the button module to start the setting method;

pressing at least one function button of a function button group of the button module; and stilling the remote controller for a first period to determine one or more function operations of the audio/video device corresponding to the at least one function button;

controlling the main body of the remote controller to have a first motion status which is sensed by the motion-sensing module and stilling the remote controller for a second period to generate a sensing signal and an operation error limit according to a structure complexity of the first motion status;

receiving the actuating signal and the sensing signal, and checking the sensing signal using an operation tolerance limit related to the operation error limit by the microprocessor unit;

a conflicting setting providing a second motion status comprising a sequential of operation motions to replace the first motion status as the sensing signal is out of the operation tolerance limit; and storing the second motion status as an action button being continuously pressed and a first control command corresponding to the one or more operations of the audio/video device in the memory.

9. The method according to claim 8, further comprising steps of:

keeping a third button of the programming button group pressed when the main body of the remote controller is controlled to have the first motion status; and releasing the third button and pressing a memory button of the programming button group to store the first motion status and the first control command.

10. The method according to claim 8 wherein the function button group is pressed to make the audio/video device to perform the one or more function operations.

11. The method according to claim 8 wherein the remote controller controls the one or more operations of the audio/video device when the main body of the main controller is held by the user and controlled to have the first motion status.

12. The method according to claim 8 wherein the first motion status of the main body includes a pitch motion, a yaw motion, a rolling motion, or a combination thereof.

13. The method according to claim 8, further comprising steps of:

checking association of the first motion status and the first control command in the memory when a memory button is pressed;

an indicator of the remote controller flashing or changing light color when a second control command is associated with the first motion status in the memory; and storing the first control command to be associated with the first motion status in the memory when the memory button is pressed again.

14. The method according to claim 8, further comprising steps of:

checking association of the first motion status and the first control command in the memory when a memory button is pressed;

an indicator of the remote controller flashing or changing light color to indicate a second control command is associated with the first motion status in the memory;

pressing the first button of the programming button group to start the setting method again;

controlling the main body of the remote controller to have a second motion status which is sensed by the motion-sensing module to generate another sensing signal; and storing the second motion status and the first control command corresponding to the one or more function operations of the audio/video device in the memory.

15. The remote controller according to claim 1 wherein the conflicting setting is to replace the motion status with the subsequent motion status.

16. The remote controller according to claim 8, wherein the structure complexity is a various sequence or/and a various combination of the pitch motion, yaw motion and roll motion.

* * * * *